US 7,659,913 B2

(12) United States Patent
Makela

(10) Patent No.: US 7,659,913 B2
(45) Date of Patent: Feb. 9, 2010

(54) METHOD AND APPARATUS FOR VIDEO EDITING WITH A MINIMAL INPUT DEVICE

(75) Inventor: Kaj Makela, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 11/016,098

(22) Filed: Dec. 17, 2004

(65) Prior Publication Data

US 2006/0132503 A1 Jun. 22, 2006

(51) Int. Cl.
*G09G 5/00* (2006.01)
*G06F 3/00* (2006.01)

(52) U.S. Cl. .................. 345/629; 345/634; 345/638; 345/639; 345/640; 345/647; 715/716; 715/719; 715/723; 715/724; 715/726

(58) Field of Classification Search ................. 348/548, 348/588; 345/629, 720, 634, 638, 639, 640, 345/647; 715/719–720, 716, 723, 724, 726
See application file for complete search history.

(56) References Cited

U.S. PATENT DOCUMENTS

| 2002/0070957 | A1* | 6/2002 | Trajkovic et al. ............. 345/719 |
| 2002/0154140 | A1* | 10/2002 | Tazaki ......................... 345/620 |
| 2002/0171682 | A1 | 11/2002 | Frank et al. |
| 2003/0002851 | A1* | 1/2003 | Hsiao et al. ................... 386/52 |
| 2003/0064757 | A1* | 4/2003 | Yamadera et al. ............ 455/566 |
| 2003/0122861 | A1* | 7/2003 | Jun et al. ..................... 345/720 |
| 2005/0100319 | A1* | 5/2005 | Saed ............................ 386/69 |

FOREIGN PATENT DOCUMENTS

| EP | 0847055 | 6/1998 |
| EP | 0890910 | 1/1999 |
| EP | 1182639 | 2/2002 |
| GB | 2344453 | 6/2000 |
| WO | WO 2004/061847 | 7/2004 |
| WO | WO 2004/064392 | 7/2004 |

OTHER PUBLICATIONS

Tneg et al., Design and Evaluation of mProducer: a mobile authoring tool for personal experience computing. International Conference on Mobile and Ubiquitous Multimedia, Oct. 27, 2004, p. 141-148, XP007904114.

(Continued)

*Primary Examiner*—Ulka Chauhan
*Assistant Examiner*—Jeffrey J Chow
(74) *Attorney, Agent, or Firm*—Foley & Lardner, LLP

(57) ABSTRACT

A system and method for displaying information about video/audio clips that are being edited. When two different clips are being matched, or when one clip is being used to replace another clip, the first clip is shown on a first timeline in a normal form. The other clip is arranged in a separate timeline to overlap with the first clip. The user is provided with the ability to easily move both clips with an input device. For individual frames that overlap, one frame is at least partially transparent so that user can see both frames at the same time.

20 Claims, 5 Drawing Sheets

OTHER PUBLICATIONS

Casares et al., Simplifying Video Editing Using Metadata. Serious Reflection on Designing Interactive Systems, Jun. 25-28, 2002, p. 157-166, XP007904113.

Girgensohn et al., A Semi-Automatic Approach to Home Video Editing. ACM Symposium on User Interface Software and Technology, Nov. 5, 2000, p. 81-89, XP001171595.

Girgensohn et al., Home Video Editing Made Easy—Balancing Automation and User Control. Interact 2001: Proceedings of the 8th International Conference on Human-Computer-Interactions, 2001, p. 464-471, XP00790411.

Tero et al., Mobile Video Editor: Design and Evaluation. Interaction Platforms and Techniques Lecture Notes in Computer Science, vol. 4551, 1900, p. 344-353, XP019062515.

European Search Report for Application EP 05 82 1645.

* cited by examiner

METHOD AND APPARATUS FOR VIDEO EDITING WITH A MINIMAL INPUT DEVICE

FIELD OF THE INVENTION

The present invention relates generally to systems for editing video segments. More particularly, the present invention relates to systems for matching and/or replacing at least two different streams of video.

BACKGROUND OF THE INVENTION

In recent years, both hardware and software technology has increased significantly, providing consumers with the ability to perform an increasing number of tasks with multimedia applications. As a result of these advances in technology, tasks that could previously only be performed by professionals in the media industry with advanced equipment can now be performed by ordinary consumers with little or no previous experience in multimedia applications using standard, over-the-counter consumer electronics and software.

Of the various multimedia applications now available to the consumer, applications involving video streaming and video editing have become particularly common. In addition to cropping, shading, and otherwise modifying the picture in a video stream, end users often desire to "combine" separate video clips, where one video clip is appended to another clip. In video editing, appending video clips to each other in order to create a single, seamless clip, requires that the user have the ability to locate, frame by frame, a location on the first video segment where a transition to the second video segment is occurring. This ability is used to maintain a focus point in a certain portion of the image and to maintain the continuity of the moving image. This searching ability requires the ability to control two video sources separately, as the ability to view both sources together.

Unfortunately, the simultaneous use and superimposition of two video streams is particularly problematic with small screens and with minimal input devices, such as those that are commonly used on devices such as mobile telephones and personal digital assistants (PDA's). Because these devices have small displays and very limited user interfaces when compared to personal computers, new problems arise it is attempted to view and edit two sets of video clips simultaneously.

SUMMARY OF THE INVENTION

The present invention provides a system and method for providing a user with information about audio/video clips that are being edited. When two different clips have to be matched, or when one clip has to replace another clip, the first clip is shown on horizontal timeline in a "normal" format. The second clip is arranged in a vertical timeline. A user has the ability to quickly and easily move both clips with a single joystick or other input device. When the input device is moved to the left or right, then the clip on the horizontal timeline is moved. When the input device is moved up and down, the clip on the vertical timeline is moved. One of the two clips is at least partially transparent so that the user can view both clips at the same time.

The present invention provides for a number of advantages over conventional systems. The system and method of the present invention allow a user to quickly and easily locate the correct position for the synchronization of timelines or for locating a cutting point between clips. Information is easily handled by the available limited user interfaces, and more information can be shown on a small screen than is the case for conventional systems.

These and other objects, advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF THE PREFERRED EMBODIMENTS

Figure 1:
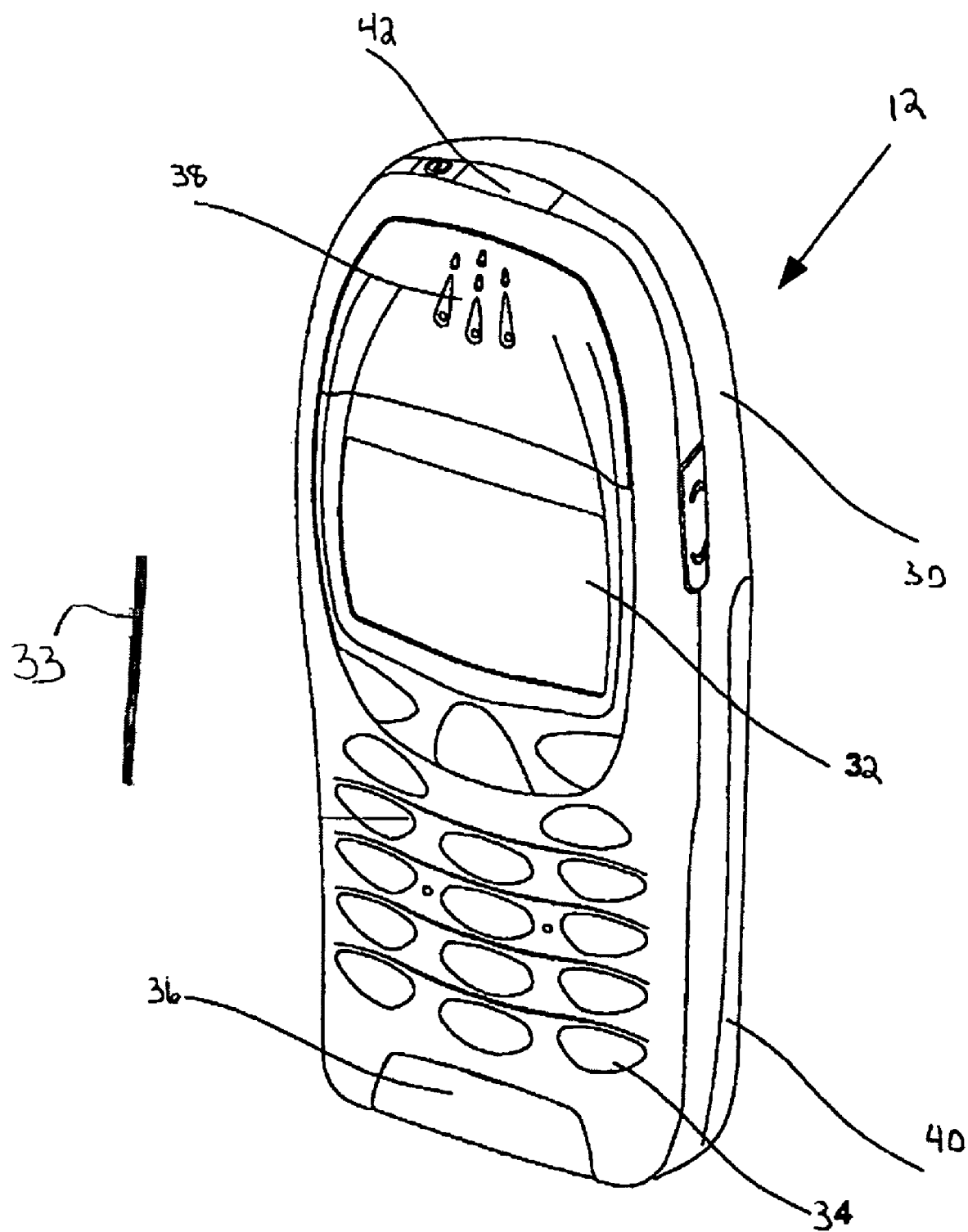
FIG. 1 is a perspective view of a mobile telephone that can be used in the implementation of the present invention.
Figure 2:
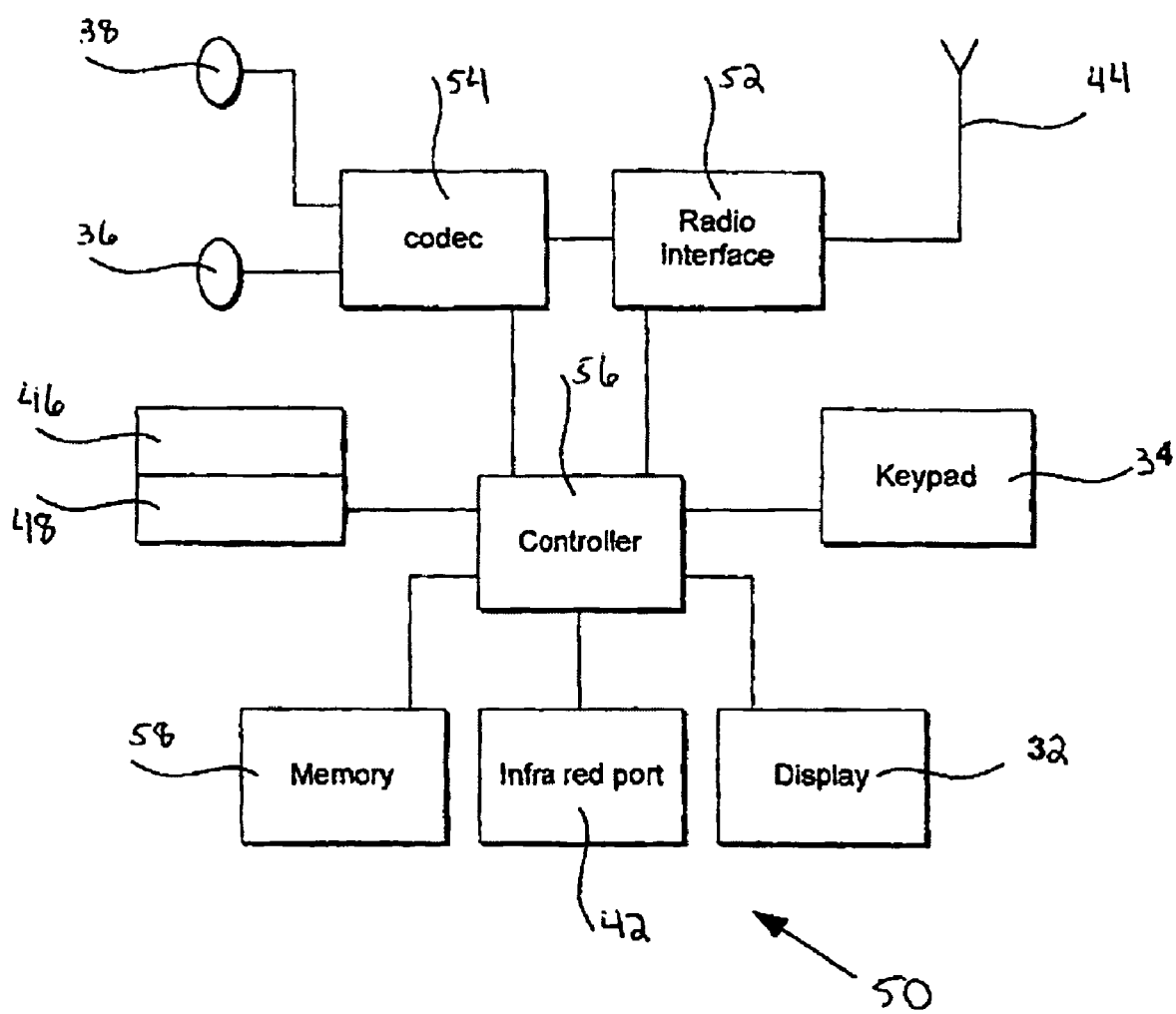
FIG. 2 is a schematic representation of the telephone circuitry of the mobile telephone of FIG. 1.

The present invention provides for a system and method for a user to quickly and easily view two different video clips simultaneously for video editing purposes. FIGS. 1 and 2 show a representative mobile telephone 12 within which the principles of the present can be implemented. It should be understood, however, that the present invention is not intended to be limited to one particular type of mobile telephone 12 or other electronic device. The present invention can also be incorporated into devices such as personal digital assistants, handheld personal computers, and many other devices. The mobile telephone 12 of FIGS. 1 and 2 includes a housing 30, a display 32 in the form of a liquid crystal display, a keypad 34, a microphone 36, an ear-piece 38, a battery 40, an infrared port 42, an antenna 44, a smart card 46 in the form of a universal integrated circuit card (UICC) according to one embodiment of the invention, a card reader 48, and mobile telephone circuitry 50. The mobile telephone circuitry 50 includes radio interface circuitry 52, coder circuitry 54, a controller 56 and a memory 58. Individual circuits and elements are all of a type well known in the art, for example in the Nokia range of mobile telephones.

In the system and method of the present invention, an appending point of two separate video streams can be searched frame by frame by showing the both streams at the same time, with one frame being transparent on the other such that both frames are visible. The video streams are presented as film strips containing the series of images. The present invention can be saved in the form of a computer software program in the memory 58 of the device.

Figure 3:
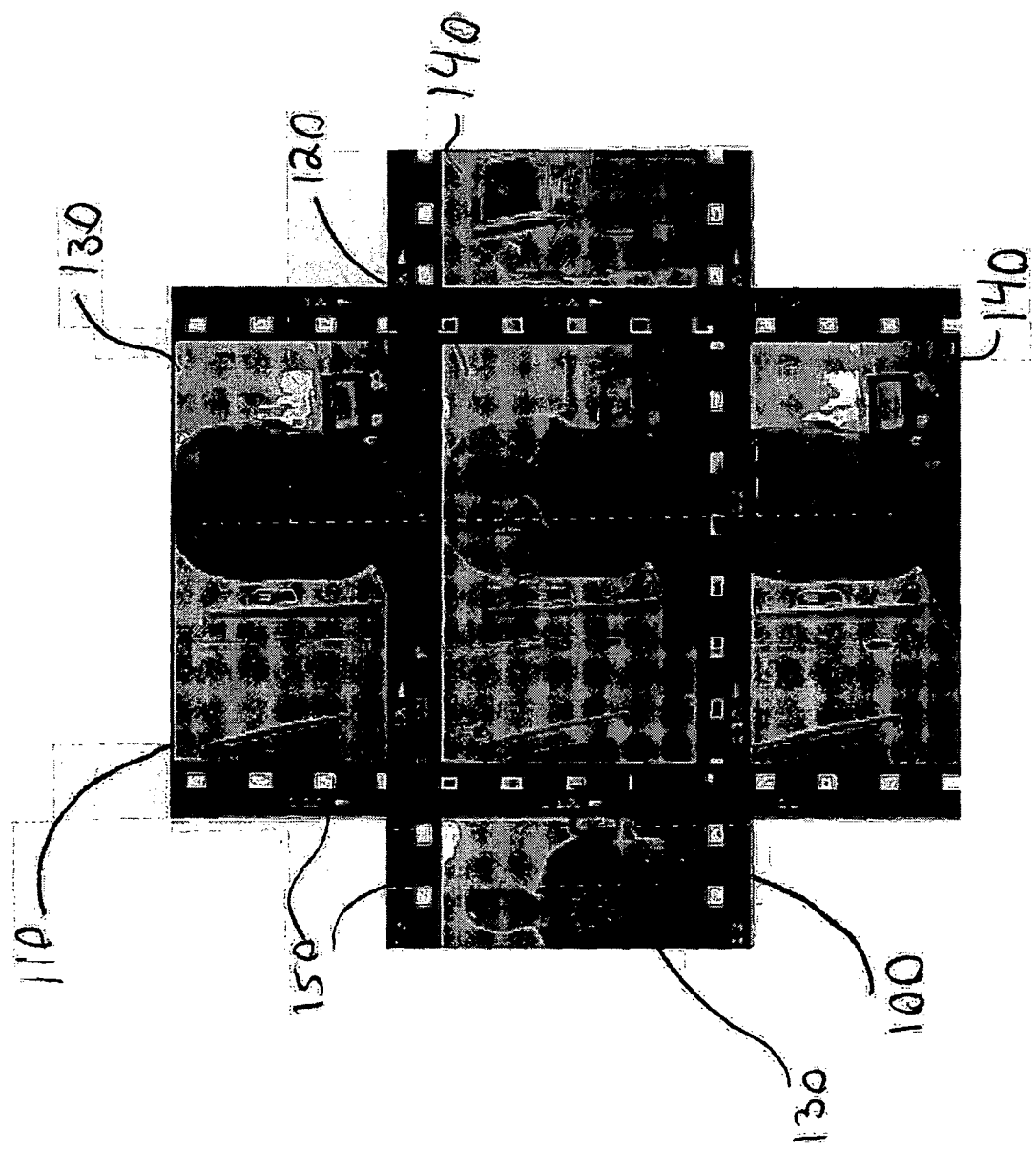
FIG. 3 is a representation of a superimposition of two separate video clips according to a first embodiment of the second invention.

FIG. 3 shows one embodiment of the present invention, where a first video stream 100 and a second video stream 110 are simultaneously displayed on a screen. In this embodiment of the invention, the first video stream 100 is presented horizontally, and the second video stream 110 is presented vertically. The first and second video streams 100 and 110 are presented so that they cross each other and overlap on one image area 120. In this embodiment of the invention, leading frames 130 and trailing frames 140 are also shown for both the first video stream 100 and the second video stream. The first video stream 100 and the second video stream 110 also include frame graphics 150 similar in appearance to conventional film in order to aid the user in understanding the context of the first and second video streams 100 and 110.

The control of the first and second video streams can be mapped to simple control, which has a possibility for pointing to at least four directions. In this particular embodiment of the invention, the first video stream 100 is controlled in the horizontal direction and the second video stream 110 is controlled in vertical direction. A wide variety of input devices can be used move among frames in the first and second video streams 100 and 110. For example, the keypad 34 of the mobile telephone of FIG. 1 can be used to move the respective streams, with individual buttons of the keypad 34 performing different functions. Alternatively, a computer mouse could also be used to move the respective streams, or a stylus 33 could interact directly with the display 32. Other input devices known in the art, such as switches, a 5-way rocker, a joystick, or a cursor key could also be used.

Additionally, a variety of input devices on the electronic device can serve as a "rotator" to further manipulate the respective video streams. For example, virtually any type of input device can be used to rotate either the first video stream 100 or the second video stream 110 in any direction, enabling a user to change the position or orientation of either steam as necessary. For devices that include a keypad, for example, the actuation of a "shift" key in combination with the actuation of the rotator can enable the user to capture a particular video stream for subsequent movement. Capacitive slide sensors can also be used to aid in moving, reorienting and/or manipulating the respective video streams.

Using the appropriate input device, a user can move both the first video stream 100 to the left and right, and can move the second video stream 110 up and down, changing the overlapping image area 120. This system provides the user with the ability to select a particular frame in both the first video stream 100 and the second video stream 110 for use in clipping and/or combining both streams. Additionally, the user can view the leading frames 130 and trailing frames 140 and use them as a guide in finding an optimal frames for in the overlapping image area 120. Once a particular overlapping image area 120 is selected, the user can provide a variety of mechanisms to transition from one stream to the other. These options include directly cutting both the first and second video streams 100 and 110 (for example, cutting all trailing frames 140 after the overlapping image area 120 for the first video stream 100 and all leading frames 130 before the overlapping image area 120 for the second video stream 110), cross-fading the streams, wiping the streams, or another method. A single, combined video stream can then be saved to the memory of the device.

Figure 4:
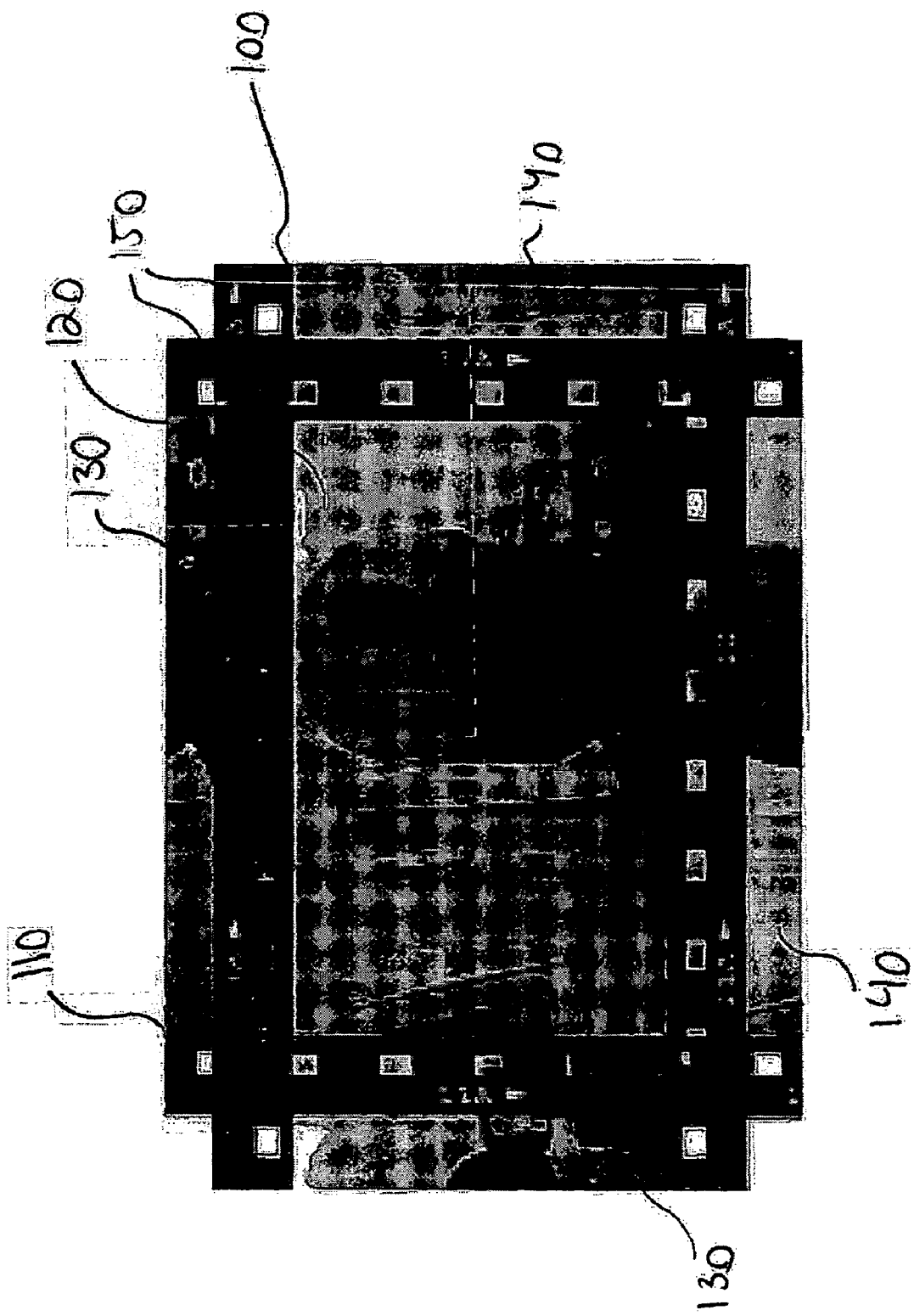
FIG. 4 is a representation of a superimposition of two separate video clips according to a second embodiment of the second invention.

FIG. 4 shows a second embodiment of the present invention. This embodiment is substantially similar to the embodiment shown in FIG. 3, except for the fact that much smaller portions of the leading frames 130 and trailing frames 140 are not shown. It is also possible to not include leading frames 130 and/or trailing frames 140 at all. The more limited use of leading frames 130 and trailing frames 140 can be particularly useful if the display upon which the first and second video streams 100 and 110 are displayed is very small, as the inclusion of leading frames 130 and trailing frames 140 reduces the size of the overlapping image area. Additionally, by including only the single, overlapping image area 120, the user is provided with more flexibility in scaling and sizing the overlapping image area 120 as he or she sees fit, which can aid in observing the image quality.

Figure 5:
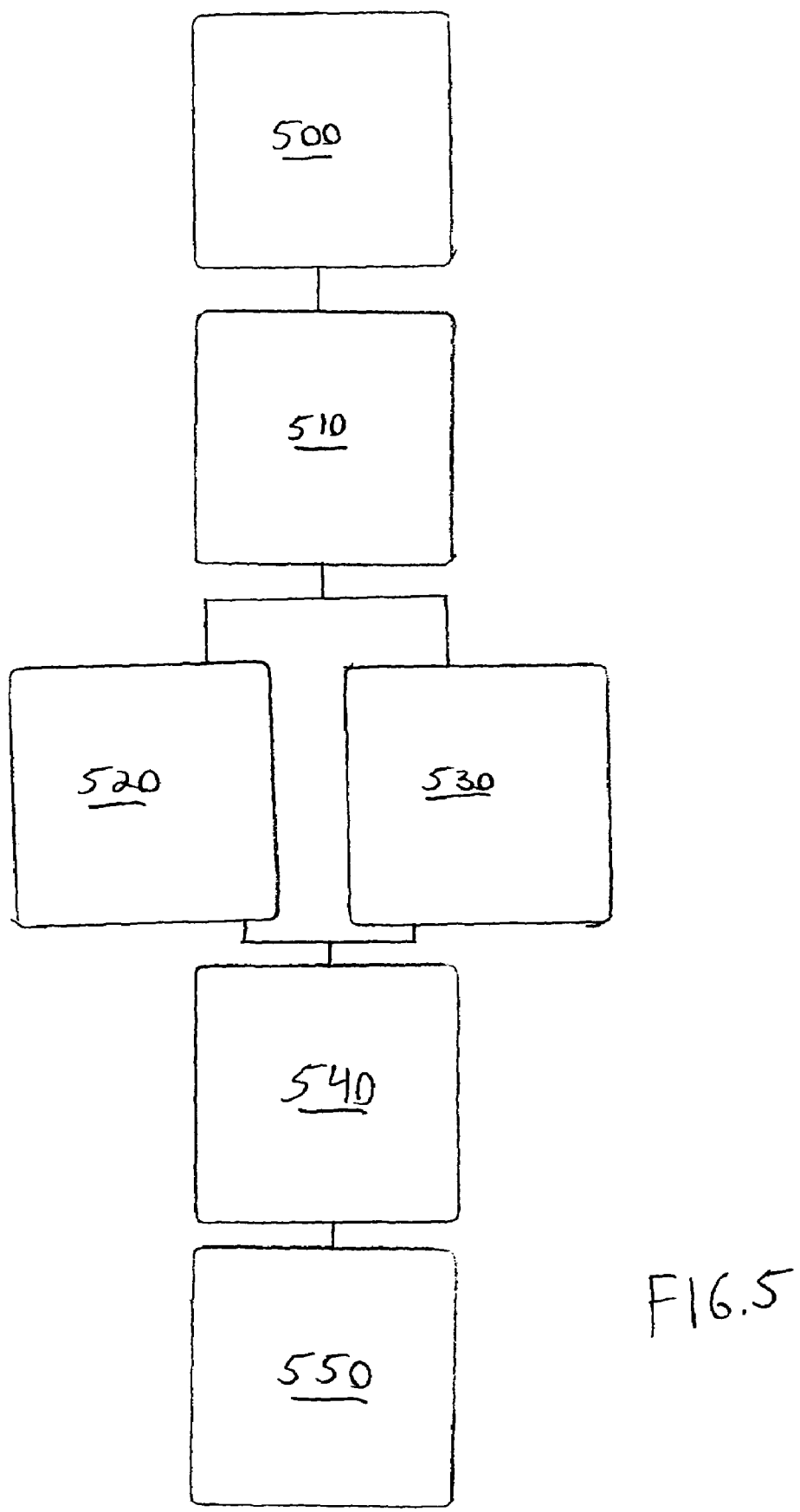
FIG. 5 is a flow chart depicting the implementation of the present invention on an electronic device.

FIG. 5 is a flow chart showing one potential implementation of the present invention. At step 500, the first video stream 100 is displayed. At step 510, the second video stream 110, creating the overlapping image area 120. It should be noted that steps 500 and 510 could occur simultaneously, or one step could occur before the other step. At step 520, the user moves the frames on the first video stream 100 to the left and right, as necessary or desired. At step 530, the user moves the frame on the second video stream 110 up and down, as necessary or desired. Steps 520 and 530 could occur simultaneously, or one step could occur before the other step. At step 540, when a user finds appropriate frames for the first video stream 100 and the second video stream 110 within the overlapping image area 120, the user selects the overlapping image area 120 for editing. As mentioned above, this step can take the form of cutting the first video stream 100 and the second video stream 110, cross-fading, wiping, or some other function. At step 550, a combined video stream is formed, which can then be saved, transmitted, or further edited as desired.

In another embodiment of the invention, the user is also provided with the ability to change the speed at which the user browses the respective video streams. For example, by modifying the amount of pressure applied to an input device, or by twisting a particular input device, the user can speed up or slow down the rate at which individual frames are viewed in either the first video stream 100 or the second video stream 110. Other methods for modifying the browsing speed could also be used.

In addition to the above, an electronic device constructed in accordance with the principles of the present invention can also include a recognition program so that a user can better manage the blending of multiple video streams. For example, a recognition program can be used to identify hot spots, human figures, or other pertinent objects in both the first and second video streams 100 and 110. The user can use this information to help locate an optimal position for combining the first and second video streams by observing how drastic a transition would be if the first and second video streams 100 and 110 were combined at a particular point.

While several embodiments have been shown and described herein, it should be understood that changes and modifications can be made to the invention without departing from the invention in its broader aspects. For example, but without limitation, the present invention could be incorporated into a wide variety of electronic devices, such as cellular telephones, personal digital assistants, and other devices. Various features of the invention are defined in the following Claims.

What is claimed is:

1. A method of showing multiple video streams; the method comprising:
   providing a first video stream including a first plurality of frames;
   providing a second video stream including a second plurality of frames; and
   using an electronic device to display the first video stream and the second video stream such that at least one of the first plurality of frames and at least one of the second plurality of frames overlap at an overlapping image area, wherein the first video stream is displayed along a horizontal axis and the second video stream is displayed along a vertical axis such that at least a portion of at least one additional frame outside of the overlapping image area from both of the first and second plurality of frames is displayed at the same time with the overlapping image area.

2. The method of claim 1, wherein at least one of the first plurality of frames before and after the overlapping image area are displayed.

3. The method of claim 1, wherein at least one of the second plurality of frames before and after the overlapping image area are displayed.

4. A method for editing multiple video streams; the method comprising:
   providing a first video stream including a first plurality of frames;
   providing a second video stream including a second plurality of frames; and
   using an electronic device to display the first video stream and the second video stream such that at least one of the first plurality of frames and at least one of the second plurality of frames overlap at an overlapping image area, wherein the first video stream is displayed along a horizontal axis and the second video stream is displayed along a vertical axis such that at least a portion of at least one additional frame outside of the overlapping image area from both of the first and second plurality of frames is displayed at the same time with the overlapping image area; and
   editing the first video stream or the second video stream.

5. The method of claim 4, further comprising the step of translating the first plurality of frames to alter what appears in the overlapping image area.

6. The method of claim 5, further comprising the step of translating the second plurality of frames to alter what appears in the overlapping image area.

7. The method of claim 4, wherein at least one of the first plurality of frames before and after the overlapping image area are displayed.

8. The method of claim 7, wherein at least one of the second plurality of frames before and after the overlapping image area are displayed.

9. The method of claim 4, wherein at least one frame in the overlapping image area is at least partially transparent.

10. A method for editing multiple video streams; comprising the steps of
    providing a first video stream including a first plurality of frames;
    providing a second video stream including a second plurality of frames;
    using an electronic device to display the first video stream and the second video stream such that at least one of the first plurality of frames and at least one of the second plurality of frames overlap at an overlapping image area; and
    selecting the overlapping image area for editing the first video stream and the second video stream,
    wherein the first video stream is displayed along a horizontal axis and the second video stream is displayed along a vertical axis such that at least a portion of at least one additional frame outside of the overlapping image area from both of the first and second plurality of frames is displayed at the same time with the overlapping image area.

11. The method of claim 10, wherein at least one frame in the overlapping image area is at least partially transparent.

12. The method of claim 11, further comprising the step of translating the second plurality of frames to alter what appears in the overlapping image area.

13. The method of claim 10, further comprising the step of translating the first plurality of frames to alter what appears in the overlapping image area.

14. The method of claim 10, further comprising the step of, after selecting the overlapping image area, transitioning the first video stream and the second video stream at the overlapping image area to create a single video stream.

15. The method of claim 10, further comprising the steps of,
    after selecting the overlapping image area, cutting all of the first plurality of frames in the first video stream after the overlapping image area;
    cutting all of the second plurality of frames in the second video stream before the overlapping image area; and
    appending the second video stream to the first video stream at the overlapping image area.

16. The method of claim 10, wherein at least one of the first plurality of frames before and after the overlapping image area are displayed.

17. The method of claim 16, wherein at least one of the second plurality of frames before and after the overlapping image area are displayed.

18. A computer program product, embodied in a memory, for editing multiple video streams, comprising:
    computer code for providing a first video stream including a first plurality of frames;
    computer code for providing a second video stream including a second plurality of frames;
    computer code for displaying the first video stream and the second video stream on a display such that at least one of the first plurality of frames and at least one of the second plurality of frames overlap at an overlapping image area; and
    computer code for selecting the overlapping image area for editing the first video stream and the second video stream,
    wherein the first video stream is displayed along a horizontal axis and the second video stream is displayed along a vertical axis such that at least a portion of at least one additional frame outside of the overlapping image area from both of the first and second plurality of frames is displayed at the same time with the overlapping image area.

19. An electronic device, comprising:
    a display for displaying information;
    means for providing a first video stream including a first plurality of frames,
    means for providing a second video stream including a second plurality of frames,
    means for displaying the first video stream and the second video stream on the display such that at least one of the first plurality of frames and at least one of the second plurality of frames overlap at an overlapping image area, and
    means for selecting the overlapping image area for editing the first video stream and the second video stream,
    wherein the first video stream is displayed along a horizontal axis and the second video stream is displayed along a vertical axis such that at least a portion of at least one additional frame outside of the overlapping image area from both of the first and second plurality of frames is displayed at the same time with the overlapping image area.

20. A system for editing streams of video, comprising:
    a processor; and
    a memory unit operatively coupled to the processor and having a computer program product, embodied in a computer-readable medium, comprising:
        computer code for providing a first video stream including a first plurality of frames, computer code for providing a second video stream including a second plurality of frames, computer code for displaying the first video stream and the second video stream on a display such that at least one of the first plurality of frames and at least one of the second plurality of frames overlap at an overlapping image area, and computer code for selecting the overlapping image area for editing the first video stream and the second video stream, wherein the first video stream is displayed along a horizontal axis and the second video stream is displayed along a vertical axis such that at least a portion of at least one additional frame outside of the overlapping image area from both of the first and second plurality of frames is displayed at the same time with the overlapping image area.

\* \* \* \* \*